United States Patent [19]

McCaskey, Jr. et al.

[11] 4,044,185
[45] Aug. 23, 1977

[54] DECORATIVE SHEET FOR SOLID COLOR LAMINATES

[75] Inventors: Harold O. McCaskey, Jr., Allendale, S.C.; Salvatore E. Palazzolo, Elizabeth City, N.C.

[73] Assignee: Westinghouse Electric Corporation, Pittsburgh, Pa.

[21] Appl. No.: 542,311

[22] Filed: Jan. 20, 1975

[51] Int. Cl.² .................. B32B 3/00; B32B 29/00
[52] U.S. Cl. .................... 428/153; 162/128; 162/185; 162/188; 428/325; 428/328; 428/330; 428/530; 428/531
[58] Field of Search ............... 162/128, 185, 188, 162, 162/181 R; 428/325, 328, 330, 530, 531, 152, 153

[56] References Cited
U.S. PATENT DOCUMENTS

| | | | |
|---|---|---|---|
| 1,672,988 | 6/1928 | Novak | 162/188 |
| 2,168,560 | 8/1939 | Charlton | 162/128 |
| 3,123,515 | 3/1964 | Barna | 428/327 |
| 3,372,084 | 3/1968 | Arledter | 162/128 |
| 3,730,828 | 5/1973 | Meiser | 428/530 |

Primary Examiner—George F. Lesmes
Assistant Examiner—S. Silverman
Attorney, Agent, or Firm—D. P. Cillo

[57] ABSTRACT

A colored decorative plastic laminate is made from a core layer and a superimposed decorative layer comprising: a fibrous material, coloring particles having a Moh's hardness of up to about 6 and an average particle size range of between about 53 to 210 microns, and thermoset resin; where the weight ratio of fiber material:coloring particles is from about 1:0.04 to 1:0.4 and the colored decorative layer is characterized in that the pigments are dispersed only through the bottom two-thirds of the colored layer and concentrated in the colored layer near the core-decorative layer interface, the top one-third of the colored layer containing substantially no pigment particles.

10 Claims, 3 Drawing Figures

DECORATIVE SHEET FOR SOLID COLOR LAMINATES

BACKGROUND OF THE INVENTION

Decorative laminates are employed for making table tops, desk tops, sink counters and other members. In making members such as sink counters with integral splash board and rounded edges, it is advantageous to use decorative laminates that can be postformed to a desirable curvature. These laminates are sold in a flat form which, upon heating, will become sufficiently flexible, so that it can be postformed using a suitable hot mold, to arcs of radii of less than three-fourths inch (0.3 cm), for a thickness of from about 3/64 to 1/16 inch (0.019 to 0.006 cm).

Most composite decorative postformable laminates will be made of a core or body layer comprising a plurality of sheets of fibrous material impregnated with a flexibilized thermoset resin. On top of this core, a decorated surface comprising a fibrous print sheet material is bonded. This decorative sheet has either a design printed thereon, or pigments dispersed therethrough to provide a solid color decorative print sheet. Suitable postformable laminates of these types are taught by Palazzolo et al in U.S. Pat. No. 3,378,433.

Ordinarily, a separate resin impregnated clear protective overlay sheet, which may contain some abrasive filler particles, such as silica having a Moh's hardness of 7, is employed over the printed design sheet. This overlay provides better abrasion resistance and good surface appearance. The overlay will be clear, the fibers, resin and any silica used having a similar refractive index, so that the pattern of the print sheet can be seen. These filler particles can be added by various methods, such as those taught by Fuerst, in U.S. Pat. No. 3,373,070 and by Treat, in U.S. Pat. No. 3,287,207, where filler is added to the paper in the paper making process, and by Michl, in U.S. Pat. No. 3,135,643, where filler, thermosetting resin and fibers are coated onto a decorative print sheet to form a separate clear protective overlay.

Pigmented decorative sheets having no printed design will ordinarily have good abrasion resistance and not require a protective overlay sheet. However, such sheets, without an overlay sheet are relatively inflexible. In high pressure postforming laminates, the pigmented solid color laminates without a separate, attached overlay sheet surface have not performed well when postformed to relatively small radii. The primary reason for this appears to be that solid color print sheet papers contain a large amount of colored material, such as china clay, titanium dioxide, and various other pigments, that reduce the paper fiber strength required for satisfactory postforming operations.

Meiser, in U.S. Pat. No. 3,730,828, recognized cracking problems in postformable laminates containing patterned and solid color print sheets. He attempted to solve the problem by using unplasticized, low formaldehyde content impregnating resin in a barrier sheet, which was applied to the post-formable substrate. The use of a separate overlay sheet of course solves the problems, but adds significantly to the cost of the product and requires extra processing steps and in some cases delicate handling procedures.

All of these methods: using separate protective overlay sheets or impregnating the overlay, barrier or decorative print sheets with a highly flexible resinous composition, involve extra processing steps, use excessive filler, or filler that is too hard, making the laminate difficult to machine, or are tedious and expensive. And so, a simplified, low cost method is needed to provide flexible, machinable, pigmented, solid color decorative print sheets which can bond to a core, to provide a laminate that can be postformed to arcs of radii of ¾ (0.3 cm) inch or less without cracking.

SUMMARY OF THE INVENTION

We have found that it is possible to make a composite structure comprising a highly flexible, pigmented decorative print sheet bonded to a postformable substrate by: (A) distributing an aqueous slurry of fibrous material and finely divided coloring material particles on the moving wire of a papermaking machine; such that the coloring particles are concentrated near the wire, near the bottom half of the forming paper, to provide a colored paper sheet, (B) drying the colored containing paper sheet, (C) impregnating the colored paper sheet with a thermosettable resin, (D) applying the colored resin containing paper sheet directly to a postformable core of fibrous material impregnated with a thermosettable resin, and (E) heat and pressure consolidating the colored paper sheet and postformable substrate; to provide a laminate having a flexible, fibrous, pigmented, resinous top surface and a flexible core, said laminate not containing a separate protective layer. This provides a colored laminate that uses standard impregnating resins and is postformable without the use of a separate transparent overlay protective sheet, that is made separately from the pigmented print sheet.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Generally, this invention relates to a composite laminate of about 3/64 to 1/16 inch (0.019 to 0.006 cm) thickness having a colored decorative surface, which is cured in a relatively flat condition and which can be post-formed into complex shaped members having curves or arcs of less than about three-fourths inch radius without rupturing or otherwise deforming undesirably.

In particular, it has been discovered that such composite laminates may be prepared by combining a plurality of body or core sheets of a fibrous material impregnated and bonded together with from about 25 to about 100% of its weight of a thermoset resin, characterized by having post-forming characteristics, and a decorative pigmented print sheet layer. The decorative layer comprises a sheet of fibrous material with a predetermined colored pigment content and carrying from about 35 to about 135% of its weight of a clear resinous material, preferably a clear melamine-aldehyde resin. This decorative pigmented layer contains a majority of the coloring material particles close to the pigmented layer-core layer interface, in the bottom half of the pigmented paper layer.

Figure 1:
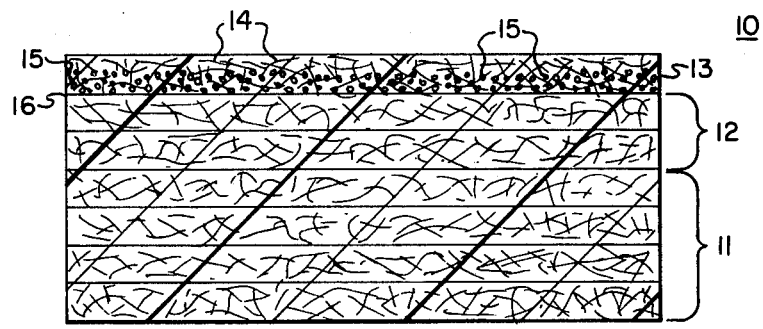
FIG. 1 is a cross section through a laminate prepared according to the method of this invention.

Referring to FIG. 1 of the drawings, a laminate prepared according to the method of this invention is shown as 10. A plurality of body or core sheets, generally from about 3 to 6 sheets depending on the desired laminate thickness, are shown at 11. The core sheets generally comprise stretchable creped kraft paper having a basis weight of between about 50 to 150 pounds per 3,000 sq. feet. The creped paper helps in providing postformability, extension taking place by straightening out of bodily folded or creased zones of the paper web. Such creped paper is capable of between about 20–40% stretch and may vary in thickness from about 5 to 20 mils (0.005 to 0.020 inch or 0.012 to 0.05 cm), with a preferred paper thickness of about 8 to 12 mils.

Preferably, from 1 to 3 sheets of conventional kraft paper 12 is inserted or sandwiched between the core sheets 11 and the decorative sheet 13. The basis weight and thickness of the conventional kraft paper is the same as described above for the creped paper. Both the conventional kraft paper layer 12 and the creped kraft paper core layer 11 are usually impregnated with a phenol-aldehyde resin varnish, effectively plasticized by the addition of small effective amounts, generally 1 to 15 parts per 100 parts phenolic resin, of resins and/or lignins and/or modified lignins and/or other suitable plasticizers known in the art.

Generally, the phenolic resin is prepared by reacting about 1 mole of a phenol and from about 0.9 mole to 1.7 moles of formaldehyde under reflux; the reaction being catalyzed by an alkaline catalyst such as ammonia, sodium hydroxide, lime etc., and then vacuum dehydrated at a temperature not exceeding 100° C. More particularly, 3 parts of phenol, 3.15 parts of aqueous formaldehyde (37%) and 0.010 parts of sodium hydroxide were added to a reaction kettle. The components were mixed thoroughly and heated to about 100° C. The mixture was refluxed for 1 hour. The reaction mixture was then vacuum dehydrated at a reduced pressure of 20 to 26 inches of Hg until the temperature again reached 100° C and was held at this temperature for ten minutes. These phenolic compositions can be flexibilized and then dissolved in a solvent such as about 1.9 parts of ethyl alcohol to make an impregnating varnish with a solids content of approximately 50 to 55%.

The sheets of kraft paper used in layers 11 and 12 may be impregnated with the resin varnish in any conventional manner. The kraft paper sheets may be treated to a resin ratio of between about 1.25 to 2.00, i.e. the treated sheet material carries resin in an amount equal to from about 25 to 100% of the sheet material weight alone.

Thus, the kraft paper sheeting is dipped in the varnish one or more times until it has picked up the desired amount of resin solids. The varnish impregnated paper is passed through an oven or other dryer after each dip to remove the volatile solvent. During drying, it is desirable to heat the paper treated with the varnish composition at a temperature of from about 110° to 160° C, in order to remove the solvent therefrom promptly and to advance the cure of the resin well into the B stage.

The heat treatment of the applied resin at this stage is conducted so that the resulting treated paper has a "greenness" of from about 0.5 to 8%. The greenness is determined by placing a stack of small pieces of the resin treated sheet material in a hot press and pressing it at a temperature of 175° C and a pressure of 1,000 pounds per square inch for 5 minutes, and then measuring the amount of resin that is forced out of the stack, that is, the resin that extends beyond the fibrous sheet material proper, and determining the proportion of this exuded resin to the total weight of the sample.

The decorative sheet 13, is made primarily from finely divided fibrous material such as purified generally translucent viscose rayon fibers, cellulose fibers such as bleached wood pulp fibers of high alpha cellulose content, of other similar material, all of which are well known to those skilled in the art. These high grade materials constitute the bulk of the paper. These fibers are shown at 14. This sheet generally will have a basis weight of between about 25 to 125 pounds per 3,000 sq. feet. It may vary in thickness from about 5 to 25 (0.005 to 0.025 inch or 0.012 to 0.06 cm) mils with a preferred thickness between about 8 to 15 mils. Over about 25 mils and flexibility of the laminate begins to suffer. This sheet is generally impregnated with a suitable melamine-aldehyde resin varnish effectively plasticized by the addition of small amounts, generally 1 to 20 parts per 100 parts melamine-aldehyde resin, of suitable plasticizers known in the art such as toluene sulfonamide, toluene ethylsulfonamide, and epoxy derivative plasticizers. This type resin is preferred because of its excellent wear properties, its translucency and its resistance to discoloration. However, resins prepared from other aminotriazines, urea, dicyandiamide and acrylics may also be used.

One melamine formulation contained about 224 parts of melamine, 240 parts of aqueous formaldehyde (37%) and 130 parts of water. The pH is adjusted to between about 8.3 to 8.5 with NaOH 16 wt.% toluene sulfonamide is added and the mixture cooked to a positive hydrophobe in ice water at 5° C. The mixture is then diluted with about 150 parts water and 55 parts is propyl alcohol. These resins are well known by those skilled in the art and described, for example, in U.S. Pat. No. 2,260,239. Reference may be had thereto for specific details of preparation. Suitable melamine-formaldehyde compositions are also commercially available, as for example American Cyanamid's Cymel 405 or Monsanto's Resinene 814. These melamine-formaldehyde compositions can be flexibilized and then dissolved in a solvent system composed of 10–25% alcohol in water to make an impregnating varnish with a solids content of approximately 55%.

The alpha cellulose paper may be treated to a resin ratio of between about 1.35 to 2.35, i.e. the treated sheet material carries resin in an amount equal to from about 35 to 135% of the sheet material weight alone. It is impregnated and dried as described above for the kraft paper to a "greenness" of from about 1 to 8%.

The decorative sheet 13, also contains coloring material particles 15 which are dispersed through the sheet 13, but concentrated near the bottom of the sheet, close to the barrier layer-core layer interface 16. When the generally clear or translucent fibers are impregnated with the clear melamine resin, the color imparted by the particles shows through and provides a colored decorative laminate.

The coloring material particles that can be used include china clay, titanium dioxide, zinc oxide, barium sulphate, calcium carbonate, talc and various other pigments, or any other particulate colored material that is compatible with the melamine resin and is effective to impart color to the sheet. The pigments need not all be the same color. Combinations of colored particles can be used to impart various decorative effects. The particles cannot include clear or translucent pigments such as silica, however, since it would allow the core to show through the barrier print sheet layer. It is also highly desirable to use pigments that are below about 6 of the Moh's hardness scale so that the laminate can be machined without ruining machining tools.

The average particle size of the particulate colored material must range between about 53–210 microns, i.e. 270 mesh up to about 70 mesh, Tylar Standard Screen Scale. Below about 53 microns, little color would be imparted to the laminate surface in this particular application, since the particles are mostly near the bottom of the paper; also, problems are encountered in retaining the particles within the paper fiber web during paper manufacture. Above about 210 microns and the material would begin to harm the postformability properties of the laminate.

The weight ratio of fiber material:coloring particles that can be effectively used in the decorative barrier print sheet 13 is from about 1:0.04 to 1:0.4, i.e. about 4 to 40% based on paper weight. Below about 0.04 per 1 part fiber, little color would be imparted to the laminate surface. Above about 0.4 per 1 part fiber, the excess particles would begin to harm postformability properties of the laminate, since the fibers are primarily responsible for providing strength to resist cracking during postforming operations. Generally, less coloring particles are needed for a dark surface finish, usually a ratio of about 1:0.06, whereas white colored surfaces require a high ratio of pigment, usually a ratio of about 1:0.35 fiber to coloring particles.

The decorative print sheet 13, will provide, in a single layer, a combination flexible, decorative print sheet-protective overlay sheet, having extremely good postformability, and compatibility and bondability with post-formable core layers in a decorative laminate. Even though a large percentage of the pigment is near the print sheet-core interface good bonding occurs at that surface. It will eliminate the use of a separate, thin, protective overlay sheet with its associated handling problems, while solving the problem associated with standard colored print sheet cracking during postforming operations.

Figure 2:
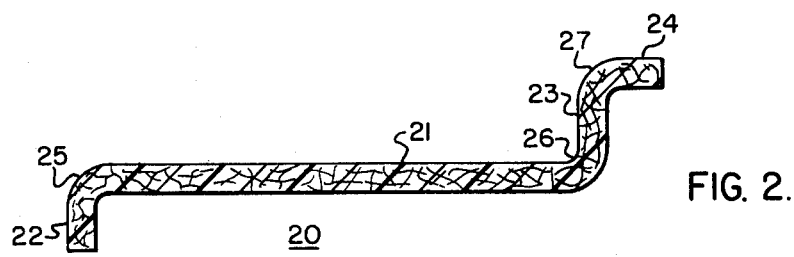
FIG. 2 is a cross section through a postformed sink top.

FIG. 2 shows a cross section of a sink or counter top or drain board 20 that can be postformed from the flat, fully cured laminate shown in FIG. 1. The sink top 20 comprises a flat working surface 21, a front edge 22, a splash board 23 and a rear edge 24 joined with rounded corners at 25, 26 and 27. The size and shape of these portions and the radii of the corners may be varied readily and within wide limits. Adjustable molds may be employed to shape a flat sheet of the laminate of this invention at low pressures of about 10 to 100 psi after it has been heated to about 165° C to the shape 20. After cooling to below about 100° C, pressure may be released and the shaped laminate withdrawn from the mold and installed in place.

Figure 3:
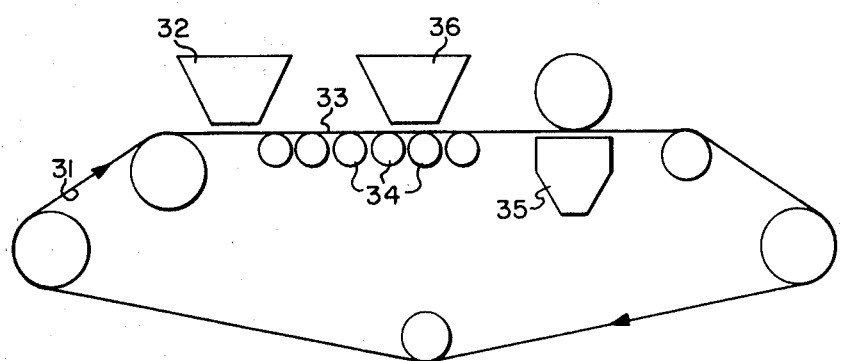
FIG. 3 is a view of one type of papermaking machine that can be used to make the pigmented print sheets of this invention.

Referring now to FIG. 3, one example of a papermaking machine is shown that can be used to continuously produce the decorative pigmented sheet of this invention. A fiber pigment slurry feed is fed onto the wire 31 from headbox feed means 32 to form web at 33. A series of table rolls 34 are shown upstream from vacuum box 35, which applies suction to remove the water and form the filled paper. Headbox feed means 36 which distributes only a fiber slurry is shown downstream from headbox 32.

In the method of this invention it is important that the pigments be concentrated in the bottom one-half of the paper, preferably between the bottom one-fourth of the paper to the wire. The pigments may be distributed through the bottom two-thirds of the paper, with the top one-third containing substantially all fiber with no pigment. The end use of this paper as a combination protective-print sheet having postforming characteristics, requires a non-homogeneous dispersion of pigment and a top surface having substantially no pigment particles. In this process, the colored particles are gradually drawn to the bottom side of the forming paper; the particle size and content with respect to the paper fibers being effective to not cause large pigment losses through the wire while concentrating the pigment at the bottom of the paper.

EXAMPLE 1

In preparing the decorative barrier print sheet of this invention, a piece of 29 pound basis weight alpha cellulose overlay paper, weighing approximately 10 grams was cut into small squares approximately 1 × 1 inch. The small squares were placed in a blender with approximaely 1,000 cubic centimeters of water. The mixture was blended until the paper and water were beat into a homogeneous pulp.

A piece of 95 pound basis weight green print sheet paper, comprised essentially of alpha cellulose fibers and green coloring material particles, weighing approximaely 10 grams was cut into small squares approximately 1 × 1 inch. The average particle size of the green pigment in the print sheet was between about 125 to 210 microns, i.e. between about 120 to 70 mesh. The weight ratio of fiber:coloring particles was about 1:0.10, i.e. about 10% based on paper weight. The small squares were placed in a blender with approximately 1,000 cubic centimeters of water. The mixture was blended until the paper and water were beat into a homogeneous pulp.

The homogeneous pulp of green print sheet paper was then poured onto and evenly spaced over a 1 ft. diameter box type screen, having mesh openings of approximately 125 microns, 120 mesh, Tyler Standard Screen Scale, with a vacuum air hose attached underneath. A partial vacuum was then drawn on the screen to remove excess water. Then, the homogeneous pulp of overlay paper was poured onto and evenly spread over the paper in the box screen, and a partial vacuum drawn on the screen to remove excess water. The vacuum also caused the pigment particles to filter down somewhat through the alpha-cellulose paper and concentrate near the bottom quarter of the paper fibers. Thus the paper formed contained all the pigment in the bottom two-thirds of the paper with a concentration near the screen surface.

The paper formed on the screen was about 15 mils thick and was then dried in a forced air oven at about 120° C until a moisture content of approximately 5% was obtained. The paper was then removed from the screen. The paper was light green, well-bound together, and had a weight ratio of fiber:coloring particles of about 1:0.077, i.e. about 7.7% based on paper weight. The pigment was below 6 on the Moh's hardness scale, was between about 125 to 210 microns in diameter, and was concentrated at the back two-thirds of the sheet, i.e. the surface that was next to the screen.

This light green solid color decorative barrier print sheet was treated by dipping in a melamine-formaldehyde liquid resinous composition to a resin ratio of about 1.50 to 1.65, i.e. about 50 to 65% based on sheet material weight alone. The impregnated sheet was dried in a forced air oven at about 120° C to partially cure, i.e. B stage the resin and dry it to a greeness of about 5%.

Body of core sheets of 108 pound basis weight regular kraft and creped kraft paper were impregnated with the liquid phenol-formaldehyde resin described above to a resin content of about 1.35, i.e. about 35% based on sheet material weight alone. The body sheets were about 12 mils thick and were heated in a forced air oven at about 120° C to partially cure, i.e. B stage the resin and dry it to a greeness of about 1%.

A stack was made up of 3 creped kraft paper core sheets covered by two sheets of regular uncreped kraft paper. The solid color decorative barrier print sheet was placed on top of the core. The core and print sheet dimensions were 3 square inches. A release paper and sheet of aluminum foil were placed respectively over the print sheet and the assembly was placed in a press and molded at about 1,000 psi, with a platen temperature of about 175° C for 5 minutes. It was heat and pressure consolidated to a unitary strongly bonded laminate which would exhibit good postforming characteristics.

We claim:

1. A machinable, colored, postformable decorative plastic laminate comprising a core layer of a plurality of resin impregnated fibrous sheets, and superimposed thereon a resin impregnated, colored decorative layer consisting of fibrous material selected from the group consisting of rayon, cellulose wood pulp and mixtures thereof, coloring particles having a Moh's hardness of up to about 6 and an average particle size range between about 53 to 210 microns and resin; wherein the weight ratio of fibrous material:coloring particles is from about 1:0.04 to 1:0.4; the colored decorative layer characterized in that the coloring particles are dispersed only through the bottom two-thirds of the colored layer and concentrated in the colored layer near the core-decorative layer interface, the top one-third of the colored layer containing substantially no coloring particles, the colored laminate characterized by having no separate clear protecting overlaying layer.

2. The laminate of claim 1, wherein the resin used in the core layer is a phenolic resin, and the resin used in the colored decorative layer is a melamine resin.

3. A machinable, colored, postformable decorative plastic laminate consisting of a core layer of a plurality of resin impregnated fibrous sheets, and superimposed thereon a thermoset resin impregnated, colored decorative layer consisting of fibrous material selected from the group consisting of rayon, cellulose wood pulp and mixtures thereof, coloring particles having a Moh's hardness of up to about 6 and an average particle size range between about 53 to 210 microns and thermoset resin; wherein the weight ratio of fibrous material: coloring particles is from about 1:0.04 to 1:0.4; the colored decorative layer characterized in that the coloring particles are dispersed only through the bottom two-thirds of the colored layer and cncentrated in the colored layer near the core-decorative layer interface, the top one-third of the colored layer containing substantially no coloring particles, the colored laminate characterized by having no separate clear protecting overlaying layer.

4. The laminate of claim 3, wherein the resin used in the core layer is a phenolic resin, and the resin used in the colored decorative layer is a melamine resin.

5. The laminate of claim 4 having a thickness of between about 3/64 to 1/16 inch, the core sheets consisting of two paper layers, the core layer next to the colored layer being uncreped paper and the other core layer being stretchable creped paper.

6. The laminate of claim 4 wherein both the phenolic resin and the melamine resin contain effective amounts of plasticizer, the resin ratio in the core sheets is between about 1.25 to 2.00, the resin ratio in the colored layer is between about 1.35 to 2.35 and the fibers in the colored layer are finely divided alpha cellulose fibers.

7. The laminate of claim 4 wherein the colored layer has a thickness of between about 5 to 25 mils.

8. A machinable, colored, post-formable sheet consisting of alpha cellulose fibrous material, coloring particles having a Moh's hardness of up to about 6 and an average particle size range of between about 53 to 210 microns, and thermoset melamine resin; wherein the weight ratio of fibrous material:coloring particles is from about 1:0.04 to 1:0.4; the colored sheet characterized in that the coloring particles are dispersed only through the bottom two-thirds of the sheet, the top one-third of the colored sheet containing substantially no coloring particles, the sheet characterized by having no separate, clear protecting overlaying layer.

9. The sheet of claim 8 having a thickness of between about 5 to 25 mils and a resin ratio of between about 1.35 to 2.35.

10. The sheet of claim 9, wherein the melamine resin contains an effective amount of plasticizer.

* * * * *